W. D. HOOKER.

Valves for Pumps.

No. 5,881. Reissued May 19, 1874.

Witnesses

John L. Boone

E. M. Richardson

Inventor

William D. Hooker by Dewey & Co

Attys

AM. PHOTO-LITHOGRAPHIC Co. N. Y. (OSBORNE'S PROCESS.)

UNITED STATES PATENT OFFICE.

WILLIAM D. HOOKER, OF SAN FRANCISCO, CALIFORNIA.

IMPROVEMENT IN VALVES FOR PUMPS.

Specification forming part of Letters Patent No. 147,004, dated February 3, 1874; reissue No. 5,881, dated May 19, 1874; application filed April 25, 1874.

*To all whom it may concern:*

Be it known that I, WILLIAM D. HOOKER, of San Francisco, California, have invented a new and useful Improvement in Pumps, of which the following is a clear, full, and exact description.

My invention consists in a combination of a threaded valve-seat with a threaded screw, both provided with a flange, as hereinafter explained.

Figure 1:
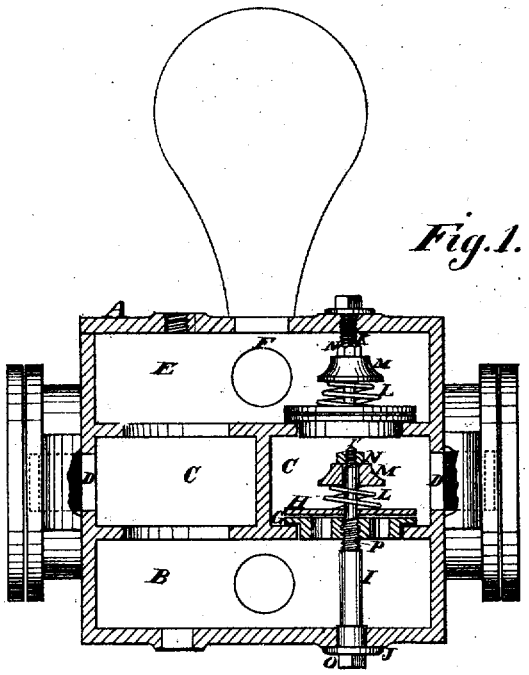
Figure 2:
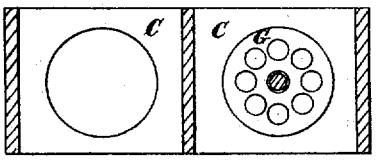
Figure 3:
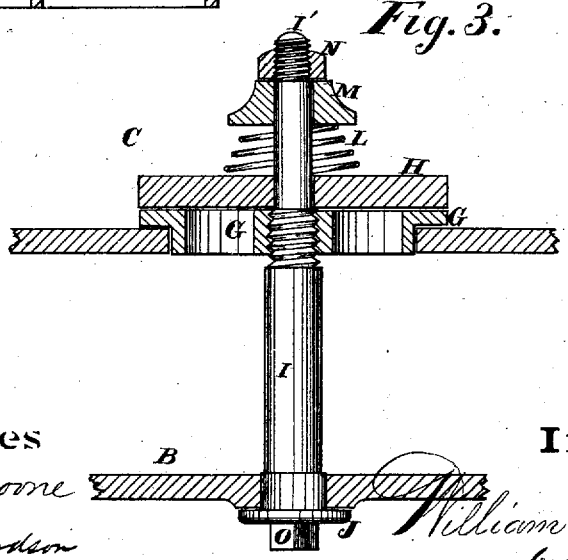

Referring to the accompanying drawings for a more complete explanation of my invention, Figure 1 is a longitudinal section of the valve-chamber, showing the valves. Fig. 2 is a view, showing the valve-seat with its openings. Fig. 3 is an enlarged view of the valve-seat and threaded spindle.

A is the valve-box of the pump, having the vacuum-chamber B at the bottom. Above this are the suction-valve chambers C C, which connect with either end of the pump-cylinder at D. The delivery-valve chamber E is situated above the chamber C, and has its discharge at F. The valve-seats G are turned to fit into openings which are made for them in the bottom of the chambers, and a flange at their upper edges rests upon the faced surface, making a tight fit, and also preventing them from passing through. The valves H are placed upon the seats, being made circular, and of suitable material to work freely. The seats G are perforated, as shown in Fig. 2, beneath the valves, so as to allow the water to pass freely when the valves lift. In order to secure the suction-valve seat in its place, pack or draw it down tight upon its seat, and guide its valve at the same time, I employ a screw-bolt, I, which enters the bottom of the vacuum-chamber directly below the valve-seat, and has a screw-thread, P, cut upon it at such a point that it will screw into a corresponding thread in the valve-seat G. The bolt has a head, O, by which it is turned, and a flange, J, which is faced to fit the bottom of the vacuum-chamber, thus keeping it perfectly tight, either with or without other packing. The upper end of the spindle I′ extends above the valve-seat G, to a point near the bottom of the valve-seat above, (from which, however, it is entirely separated,) and this extension serves to guide the valve H in its movements.

It will be manifest that, after laying the valve and its seat in position, the seat can be drawn down firmly upon its bearing-surface, and thus made secure and water-tight by simply inserting the screw-bolt I and turning it around until the screw-thread draws the valve-seat G down, the flange J being, at the same time, drawn up against the bottom of the vacuum-chamber. By this one movement I am enabled to pack both valve-seat and vacuum-chamber.

The upper or discharge valve is guided, and its seat kept in place, by means of the spindle K, which enters the chamber from the top, and has a thread cut upon its upper end, so as to screw into the top plate of the valve-chamber. The lower end of this spindle passes through a hole in the center of the valve, and into a socket in the top of the valve-seat, thus holding the seat firmly in place when screwed down. A head and flange are made upon the upper end of the spindle K, similar to the flange J upon the screw-bolt I, and this serves to pack the discharge-chamber where the spindle enters it.

In order to regulate the lift of the valve, a coiled spring, L, surrounds the spindle, and a plate or buffer, M, is made to slip down upon the spindle, and rest upon it. A check-nut, N, screws down upon the spindle, and forces the buffer and spring down, so as to regulate the tension of the valve as may be desired.

By these means I am enabled to hold my valve-seats independently of each other, so that any valve or seat can be easily replaced, if worn, guide the valves, and regulate the lifts, without disturbing any other valve, or any of the permanent parts of the pumps.

I am also enabled by one movement of the screw P to draw the valve-seat G and the flange J of the bolt I against their respective faces, so as to be perfectly water-tight.

Having thus described my invention, what I claim as new, and desire to secure by Letters Patent, is—

1. The threaded valve-seat G, within the valve box or chamber of a pump, in combination with a threaded screw-bolt, I, having the collar J near its lower end and outside of the chamber, substantially as as and for the purpose set forth.

2. In combination with the threaded valve-seat G, threaded valve-spindle, and guide I, valve H, and pump-chamber, the valve-buffer M and check-nut N, substantially as and for the purpose described.

In witness whereof I hereunto set my hand and seal.

WILLIAM D. HOOKER. [L. S.]

Witnesses:
JOHN L. BOONE,
C. M. RICHARDSON.